United States Patent
Krajenke

(10) Patent No.: US 8,246,019 B2
(45) Date of Patent: Aug. 21, 2012

(54) AIR SPRING FOR VEHICLE CLOSURE

(75) Inventor: Gary W. Krajenke, Warren, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1442 days.

(21) Appl. No.: 11/766,126

(22) Filed: Jun. 21, 2007

(65) Prior Publication Data
US 2008/0315475 A1 Dec. 25, 2008

(51) Int. Cl.
*F16F 7/09* (2006.01)

(52) U.S. Cl. ............. 267/64.23; 267/134; 267/120; 188/270; 188/281

(58) Field of Classification Search ......... 267/64.11, 267/64.27, 292, 120, 124, 64.26, 64.15, 64.23, 267/196, 134; 188/270, 281, 297, 322.17; 180/69.2, 69.21; 296/193.11
See application file for complete search history.

(56) References Cited

U.S. PATENT DOCUMENTS

| | | | | |
|---|---|---|---|---|
| 2,962,330 A * | 11/1960 | Kohl | ................. | 92/244 |
| 3,368,650 A * | 2/1968 | Wasdell | ............. | 188/322.17 |
| 3,838,649 A * | 10/1974 | Barnard | ............. | 105/240 |
| 3,883,126 A * | 5/1975 | Nicholls | ............. | 267/64.12 |
| 4,372,429 A * | 2/1983 | Marx | ................. | 188/322.12 |
| 4,527,780 A | 7/1985 | Bich | | |
| 4,596,383 A | 6/1986 | Howard | | |
| 4,934,668 A * | 6/1990 | Vassmer | ............. | 267/120 |
| 4,944,498 A * | 7/1990 | Kortgen et al. | ............. | 267/64.11 |
| 5,024,303 A | 6/1991 | Kosloff | | |
| 5,120,030 A | 6/1992 | Lin et al. | | |
| 5,174,551 A * | 12/1992 | Mintgen | ............. | 267/120 |
| 5,299,787 A * | 4/1994 | Svensson | ............. | 267/64.12 |
| 5,575,513 A | 11/1996 | Tuttle | | |
| 5,606,879 A * | 3/1997 | Froelicher et al. | ............. | 68/23.3 |
| 5,887,857 A * | 3/1999 | Perrin | ............. | 267/64.12 |
| 5,960,519 A | 10/1999 | Thompson et al. | | |
| 6,273,405 B2 | 8/2001 | Okamoto | | |
| 6,634,627 B1 | 10/2003 | Stevenson | | |
| 7,621,382 B2 * | 11/2009 | Zdeb | ............. | 188/315 |
| 7,735,810 B2 * | 6/2010 | Pope et al. | ............. | 267/64.12 |
| 2009/0044998 A1* | 2/2009 | Schmidt | ............. | 180/69.21 |

* cited by examiner

*Primary Examiner* — Bradley King
*Assistant Examiner* — Thomas Irvin

(57) ABSTRACT

An air spring for use with a closure of a vehicle is disclosed. The air spring includes a rod and a tube axially slidable in the rod. The rod may include a housing having tube slots defining flexible arms with rod cam extensions extending therefrom. The rod cam extensions may have an extension rod cam surface that has a smaller angle than a retraction rod cam surface, with a rod peak between the two. The tube may include a tube cam extension having a tube peak with a diameter greater than the diameter of the rod peak. The tube cam extension may include an extension tube cam surface that has a smaller angle than a retraction tube cam surface.

20 Claims, 4 Drawing Sheets

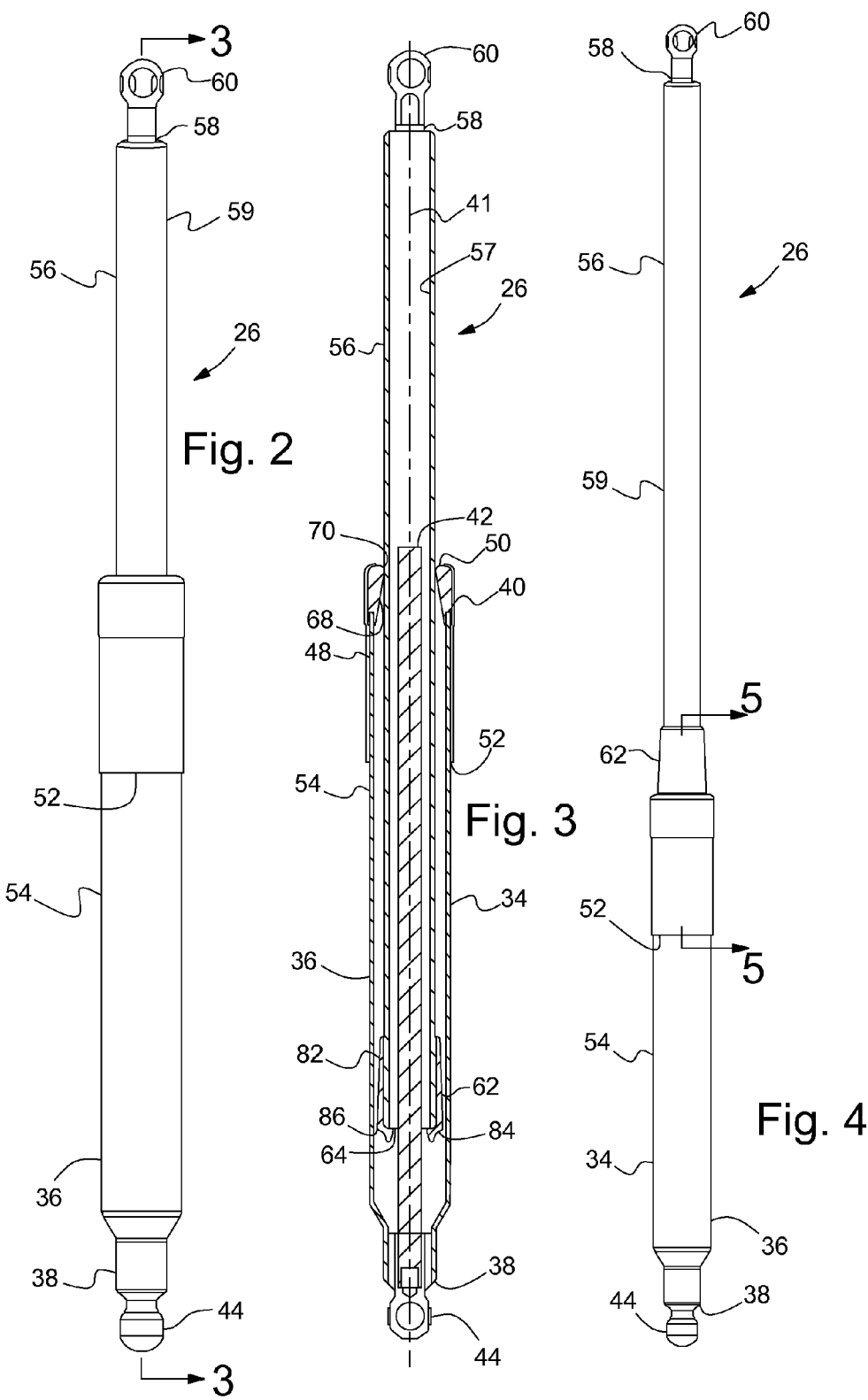

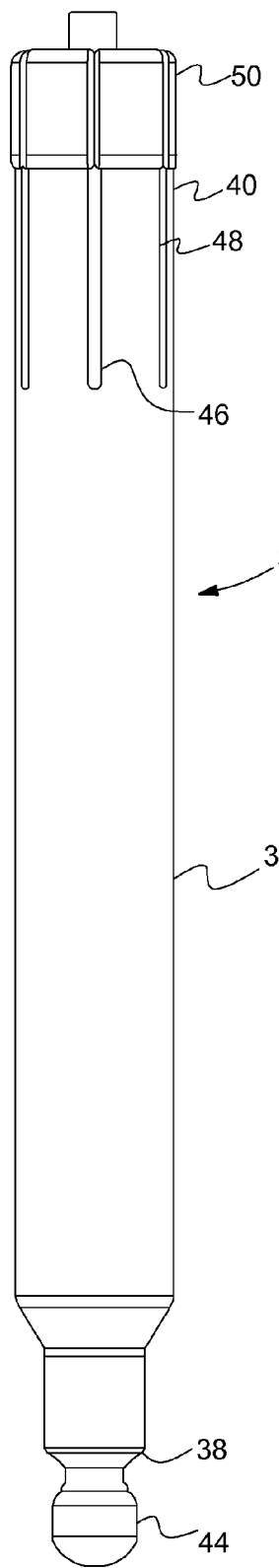
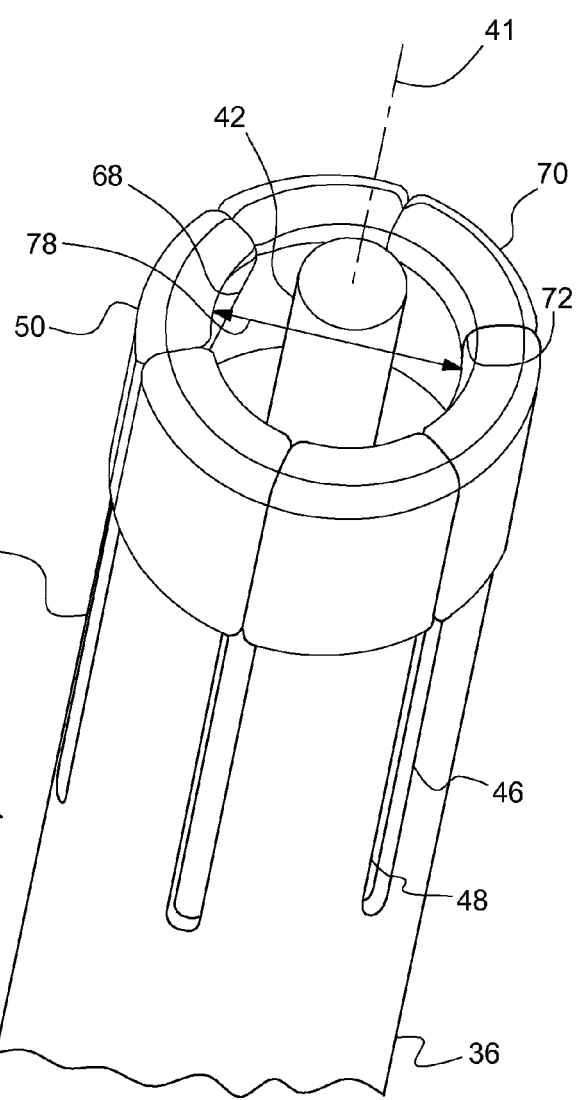

AIR SPRING FOR VEHICLE CLOSURE

BACKGROUND OF INVENTION

The present invention relates generally to an air spring for a vehicle closure.

For vehicle closures that open by swinging upward or sideways, it is usually desirable to maintain the closure in an open position in order to allow a person to gain access to the interior of the vehicle. Rear lift gates and swing gates are such vehicle closures. One or more air springs may be provided in order to maintain the particular gate (closure) in its open position while the person accesses a rear cargo area. Conventional air springs are purposely limited in their holding capability when the closure is in its full open position in order to allow for a reasonable amount of force to be exerted by a person during movement between the closed and open positions. Air springs with higher gas pressure allow for a more robust hold open, but create dissatisfaction during the closing event since the dissipating energy in the air spring does not drop off at a fast enough rate to allow for easy closing of the swing gate. Thus, a desire has arisen for a way to better hold the lift and swing gates (or other similar types of vehicle closures) in their open position while still allowing one to close the particular gate with minimal effort during the closing movement.

Some have attempted to overcome this drawback by employing a latching-type device that engages at the full open position and helps hold the closure in this open position. But such devices are undesirable in that they require a two-handed operation for the person to close the closure. That is, one hand must release the latch while the other hand pulls on the handle of the closure.

SUMMARY OF INVENTION

An embodiment contemplates an air spring for supporting a vehicle closure on a vehicle. The air spring may comprise a rod and a tube. The rod may include a hollow housing centered about a longitudinal axis, having an inner rod diameter, and having a first end and an opposed second end, the housing including at least one tube slot extending axially from the second end toward the first end and defining at least one flexible arm, at least one rod cam extension extends from the second end and includes a radially inwardly-extending rod peak defining a rod peak diameter that is less than the inner rod diameter. The tube may have an outer tube diameter centered about the longitudinal axis, a first end and an opposed second end slidably received in the housing, and a tube cam extension extending from the second end of the tube, the tube cam extension having an extension tube cam surface extending at a first angle relative to the longitudinal axis, a retraction tube cam surface adjacent to and located farther from the first end of the tube than the extension tube cam surface and extending at a second angle relative to the longitudinal axis, the second angle being larger than the first angle, and a tube peak located between the extension tube cam surface and the retraction tube cam surface, the tube peak having a tube peak diameter that is less than the inner rod diameter and greater than the rod peak diameter.

An embodiment contemplates an air spring for supporting a vehicle closure on a vehicle. The air spring may comprise a rod and a tube. The rod may include a hollow housing centered about a longitudinal axis, having an inner rod diameter, and having a first end and an opposed second end, the housing including at least one tube slot extending axially from the second end toward the first end and defining at least one flexible arm, at least one rod cam extension extends from the second end and includes a radially inwardly-extending rod peak defining a rod peak diameter, the at least one rod cam extension including an extension rod cam surface extending at a first angle relative to the longitudinal axis, a retraction rod cam surface adjacent to and located farther from the first end of the housing than the extension rod cam surface and extending at a second angle relative to the longitudinal axis, the second angle being larger than the first angle, the rod peak being located between the extension rod cam surface and the retraction rod cam surface. The tube may have an outer tube diameter centered about the longitudinal axis, a first end and an opposed second end slidably received in the housing, and a tube cam extension extending from the second end of the tube, the tube cam extension including a tube peak having a tube peak diameter that is less than the inner rod diameter and greater than the rod peak diameter.

An embodiment contemplates a vehicle comprising a vehicle structure defining a vehicle opening, a closure pivotally connected to the vehicle structure for selectively covering the vehicle opening, and an air spring pivotally mounted to the vehicle structure and pivotally mounted to the closure. The air spring may include a rod and a tube; the rod including a hollow housing centered about a longitudinal axis, having an inner rod diameter, and having a first end and an opposed second end, the housing including at least two, spaced tube slots extending axially from the second end toward the first end and defining at least two flexible arms, at least two rod cam extensions extending from the second end and including radially inwardly extending rod peaks defining a rod peak diameter that is less than the inner rod diameter; and the tube having an outer tube diameter centered about the longitudinal axis, a first end and an opposed second end slidably received in the housing, and a tube cam extension extending from the second end of the tube, the tube cam extension including a tube peak having a tube peak diameter that is less than the inner rod diameter and greater than the rod peak diameter.

An advantage of an embodiment is that the air spring will provide extra hold-open assist for the vehicle closure without requiring additional gas pressure in the air spring. Thus, higher hold-open forces are obtained without having to increase travel forces during an entire vehicle closure closing event.

An advantage of an embodiment is that the closing of the vehicle closure can be accomplished with one hand since no additional latch or other separate mechanism is required to assist in holding the closure in its open position.

An advantage of an embodiment is that the extra hold-open assist is provided while minimizing additional resistance to the opening motion of the vehicle closure.

BRIEF DESCRIPTION OF DRAWINGS

FIG. 2 is a side view of an air spring in a retracted position.

FIG. 3 is a section cut taken along line 3-3 in FIG. 2, schematically illustrating a portion of the air spring of FIG. 2.

FIG. 4 is a side view, on a smaller scale, of the air spring of FIG. 2, but shown in the extended position.

FIG. 7 is a side view of a rod, but with an elastomeric boot not shown.

FIG. 8 is a perspective view, on an enlarged scale, of a portion of the rod of FIG. 7, also with the boot not shown.

DETAILED DESCRIPTION

Figure 1:
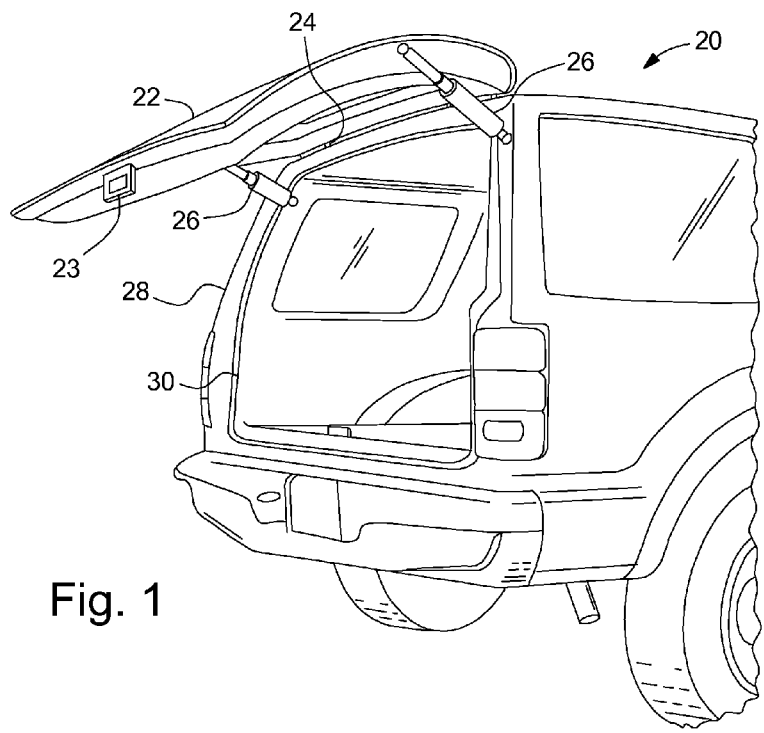
FIG. 1 is a schematic perspective view of a rear portion of an automotive vehicle.
Figure 5:
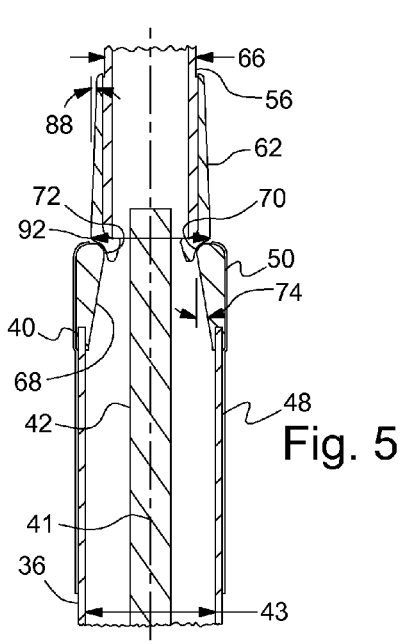
FIG. 5 is a section cut, on an enlarged scale, taken along line 5-5 in FIG. 4, schematically illustrating a portion of the air spring of FIG. 4.
Figure 6:
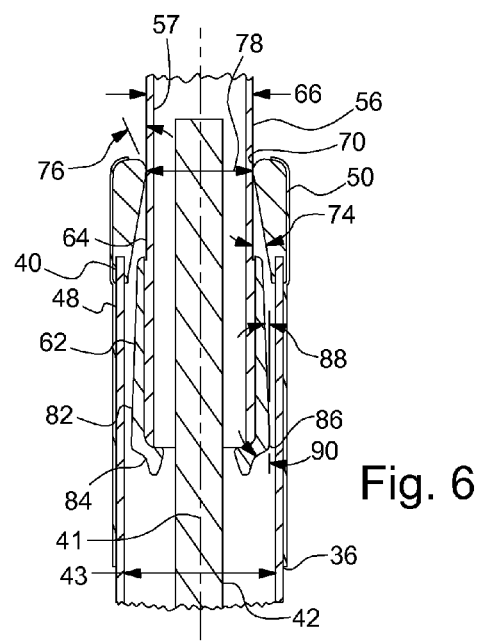
FIG. 6 is a section cut similar to FIG. 5, on an enlarged scale, but schematically illustrating a portion of the air spring in a partially extended position.
Figures 9, 10:
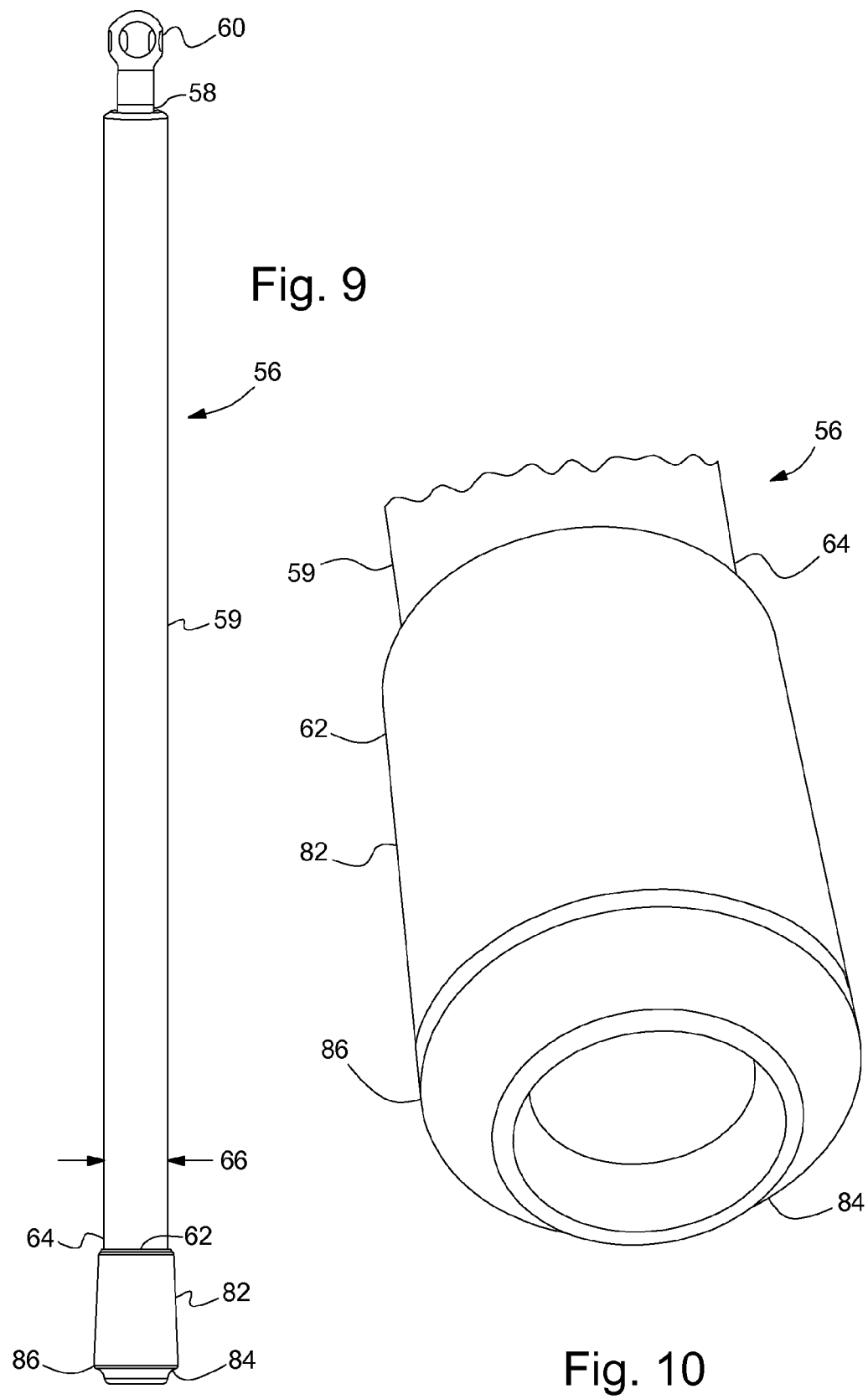
FIG. 9 is a side view of a tube.
FIG. 10 is a perspective view, on an enlarged scale, of a portion of the tube of FIG. 9.

Referring to FIG. 1, a vehicle, indicated generally at 20, is schematically shown. The vehicle 20 includes a vehicle closure 22, such as a rear lift gate, that opens and closes by pulling on a handle 23 in order to pivot the closure 22 about one or more hinges 24 attached between vehicle structure 28 and closure 22. A pair of air springs 26 are mounted between the closure 22 and the vehicle structure 28 adjacent to a vehicle opening 30. The air springs 26 are also sometimes called pneumatic springs or gas springs or gas struts. Also, while the example of the vehicle closure 22 shown is a rear lift gate, the air springs 26 may also be used for other closures, such as, for example, a hood, a pickup truck bed cover, a trunk, or other types of closures that have generally horizontal hinge axes and pivot upward to open, as well as swing gates that have generally vertical hinge axes and swing sideways to open. And, while two air springs 26 are shown, there may be instances where only one air spring 26 is employed, or where one air spring 26 and a conventional air spring (not shown) are used to support the vehicle closure.

Referring now to FIGS. 2-10, one of the air springs 26 of FIG. 1 is shown. The other air spring 26 can be essentially identical and so will not be shown separately in these figures.

The air spring 26 includes a rod 34. The rod 34 includes a hollow outer housing 36 having a first end 38 and a second end 40. The housing 36 is cylindrical and centered about a central, longitudinal axis 41 and defines an inner rod diameter 43. A piston shaft 42 is attached to the housing near its first end 38 and extends axially through the center of the housing 36 and partially out of the second end 40. The first end 38 of the housing 36 includes a rod end fitting 44 mounted thereto that connects to vehicle structure 28 (shown in FIG. 1) in what may be a conventional ball in a ball and socket configuration. The second end 40 of the rod housing 36 includes a set of tube slots 46 that extend axially from the second end 40 toward the first end 38. The tube slots 46 create a set of flexible arms 48 between the slots 46. Extending from each flexible arm 48, at the second end of the housing 36, is a rod cam extension 50, discussed in more detail below.

An elastomeric boot 52 may cover the outside surface 54 of the housing 36 at the tube slots and cover the rod cam extensions 50. The elastomeric boot 52 may shield the tube slots 46 and rod cam extensions 50 in order to prevent contaminants from entering the air spring 26. Alternatively, the elastomeric boot 52 may extend only over the tube slots 46 and over only a portion of (or over none of) the rod cam extensions 50, if so desired. The use of the elastic properties of the boot 52 will be discussed below.

The air spring 26 also includes a tube 56. The tube 56 is a hollow cylinder and slides linearly inside the housing 36 around the piston shaft 42, centered about the central, longitudinal axis 41. The tube 56 has an outer surface 59 that defines an outer tube diameter 66. A piston and seals assembly (not shown) mounts inside the tube 56 around the piston shaft 42 to form a gas chamber 57 inside the tube 56. The piston and seals assembly may be conventional, if so desired, and so will not be discussed in any detail herein. A first end 58 of the tube 56 includes a tube end fitting 60 mounted thereto that connects to the vehicle closure 22 (shown in FIG. 1) in what may be a conventional ball in a ball and socket configuration. Alternatively, the air spring 26 may be reversed, with the rod end fitting 44 attaching to the closure 22 and the tube end fitting 60 attached to the vehicle structure 28, if so desired. The tube 56 also includes a tube cam extension 62 extending from a second end 64, which is received in the rod housing 36.

The geometry and interaction of the rod cam extensions 50 and the tube cam extension 62 will now be discussed. The rod cam extensions 50 each include an extension rod cam surface 68, a retraction rod cam surface 70 and a rod peak 72 between the two surfaces 68, 70. The extension rod cam surface 68 extends at an angle 74 relative to the central, longitudinal axis 41. The retraction rod cam surface 70 generally extends at an angle 76 relative to the central, longitudinal axis 41. The angle 76 is larger than the angle 74, with the extension rod cam surface 68 being axially longer than the retraction rod cam surface 70. Also, with the flexible arms 48 in their relaxed positions, the rod peaks 72 define a diameter 78 that is about equal to or somewhat less than the outer tube diameter 66.

The tube cam extension 62 includes an extension tube cam surface 82, a retraction tube cam surface 84 and a tube peak 86 between the two surfaces 82, 84. The extension tube cam surface 82 extends at an angle 88 relative to the central, longitudinal axis 41. The retraction tube cam surface 84 generally extends at an angle 90 relative to the central, longitudinal axis 41. The angle 90 is larger than the angle 88, with the extension tube cam surface 82 being axially longer than the retraction tube cam surface 84. Also, the tube peak 86 has a diameter 92 that is larger than the outer tube diameter 66 but smaller than the inner rod diameter 43.

One will note, then, that for air spring operation in the extension direction, the angles 74, 88 of the engaged surfaces 68, 82 are smaller than the angles 76, 90 of the engaged surfaces 70, 84 in the retraction direction. This longer, less steep ramping in the extension direction will cause the magnitude of force needed to axially slide toward engagement of the peaks 72, 86 in the extension direction to be significantly less than in the retraction direction.

The operation of the air springs 26 on the vehicle closure 22, with reference to FIGS. 1-10, will now be described. Upon unlatching the vehicle closure 22 and pulling on the handle 23, the closure 22 begins to pivot outward about the hinges 24. As it pivots, the tubes 56 begin to slide axially out of their respective rods 34. The extension over the first portion of axial travel (i.e., from the retracted position shown in FIG. 3 to the partially extended position shown in FIG. 6) occurs essentially the same as with conventional air springs.

As each of the air springs 26 approaches its full extension position, the extension tube cam surface 82 begins sliding axially along the extension rod cam surfaces 68. This causes the flexible arms 48 and elastomeric boot 52 to gradually expand outward (along the smaller angles 74, 88) until the tube peak 86 aligns with the rod peak 72. As the tube peak 86 passes the rod peak 72, the radially inward bias of the flexible arms 48 and elastomeric boot 52 will cause the rod cam extensions 50 to snap inward, pressing the retraction rod cam surface 70 into engagement with the retraction tube cam surface 84. This engagement, along with the gas pressure in the gas chamber 57 will hold the vehicle closure 22 in its open position.

To close the vehicle closure 22, one pulls on the handle 23 with sufficient force to overcome the combined resistance of the gas pressure in the gas chambers 57 and the engagement of the retraction rod cam surfaces 70 with the retraction tube cam surfaces 84 (held in engagement by the bias of the flexible arms 48 and elastomeric boots 52). When the rod peaks 72 pass their respective tube peaks 86, then one only needs to overcome the gas pressure to continue closing the vehicle closure 22.

For each air spring 26, because of the difference between the extension angles 74, 88 and the retraction angles 76, 90, significantly more force is needed in the closing direction than in the opening direction to cause the tube peaks 86 to pass by the rod peaks 72 as the rod cam extensions 50 engage the tube cam extensions 62. By establishing both the rod cam angles 74, 76 and the tube cam angles 88, 90, the amount of difference in force between the opening direction and closing direction (at the near full open positions) can be set. Factors, such as the amount of deflection (i.e., difference in diameter between the tube peak 86 and the rod peaks 72), boot thickness and material, length and number of tube slots 46, and other properties can be modified, as needed, to obtain the amount of additional force induced by the tube and rod cam extensions 62, 50. Gravity, of course, will help overcome the higher forces needed during the initial movement of the vehicle closure 22 during the closing event for those vehicle closures that pivot upward to open.

While certain embodiments of the present invention have been described in detail, those familiar with the art to which this invention relates will recognize various alternative designs and embodiments for practicing the invention as defined by the following claims.

What is claimed is:

1. An air spring for supporting a vehicle closure on a vehicle, the air spring comprising:
    a rod including a hollow housing centered about a longitudinal axis, having an inner rod diameter, and having a first end and an opposed second end, the housing including at least one tube slot extending axially from the second end toward the first end and defining at least one flexible arm, at least one rod cam extension extends from the second end and includes a radially inwardly extending rod peak defining a rod peak diameter that is less than the inner rod diameter; and
    a tube having an outer tube diameter centered about the longitudinal axis, a first end and an opposed second end slidably received in the housing, and a tube cam extension extending from the second end of the tube, the tube cam extension having an extension tube cam surface extending at a first angle relative to the longitudinal axis, a retraction tube cam surface adjacent to and located farther from the first end of the tube than the extension tube cam surface and extending at a second angle relative to the longitudinal axis, the second angle being larger than the first angle, and a tube peak located between the extension tube cam surface and the retraction tube cam surface, the tube peak having a tube peak diameter that is less than the inner rod diameter and greater than the rod peak diameter.

2. The air spring of claim 1 wherein the at least one rod cam extension includes an extension rod cam surface extending at a third angle relative to the longitudinal axis, a retraction rod cam surface adjacent to and located farther from the first end of the housing than the extension rod cam surface and extending at a fourth angle relative to the longitudinal axis, the fourth angle being larger than the third angle, the rod peak being located between the extension rod cam surface and the retraction rod cam surface.

3. The air spring of claim 2 wherein the rod includes an elastomeric boot extending around an outer surface of the housing and covering the at least one tube slot.

4. The air spring of claim 1 wherein the rod includes an elastomeric boot extending around an outer surface of the housing and covering the at least one tube slot.

5. The air spring of claim 1 wherein the at least one tube slot is six tube slots, the at least one flexible arm is six flexible arms, and the at least one rod cam extension is six rod cam extensions, one each mounted on a respective one of the six flexible arms.

6. The air spring of claim 1 wherein the rod includes a rod end fitting extending from the first end of the rod and pivotally mountable to one of a vehicle structure and the vehicle closure.

7. The air spring of claim 1 wherein the tube includes a tube end fitting extending from the first end of the tube and pivotally mountable to one of a vehicle structure and the vehicle closure.

8. An air spring for supporting a vehicle closure on a vehicle, the air spring comprising:
    a rod including a hollow housing centered about a longitudinal axis, having an inner rod diameter, and having a first end and an opposed second end, the housing including at least one tube slot extending axially from the second end toward the first end and defining at least one flexible arm, at least one rod cam extension extends from the second end and includes a radially inwardly extending rod peak defining a rod peak diameter, the at least one rod cam extension including an extension rod cam surface extending at a first angle relative to the longitudinal axis, a retraction rod cam surface adjacent to and located farther from the first end of the housing than the extension rod cam surface and extending at a second angle relative to the longitudinal axis, the second angle being larger than the first angle, the rod peak being located between the extension rod cam surface and the retraction rod cam surface; and
    a tube having an outer tube diameter centered about the longitudinal axis, a first end and an opposed second end slidably received in the housing, and a tube cam extension extending from the second end of the tube, the tube cam extension including a tube peak having a tube peak diameter that is less than the inner rod diameter and greater than the rod peak diameter.

9. The air spring of claim 8 wherein the rod includes an elastomeric boot extending around an outer surface of the housing and covering the at least one tube slot.

10. The air spring of claim 9 wherein the elastomeric boot also extends around at least a portion of the at least one rod cam extension.

11. The air spring of claim 8 wherein the at least one tube slot is six tube slots, the at least one flexible arm is six flexible arms, and the at least one rod cam extension is six rod cam extensions, one each mounted on a respective one of the six flexible arms.

12. The air spring of claim 8 wherein the rod includes a rod end fitting extending from the first end of the rod and pivotally mountable to one of a vehicle structure and the vehicle closure.

13. The air spring of claim 8 wherein the tube includes a tube end fitting extending from the first end of the tube and pivotally mountable to one of a vehicle structure and the vehicle closure.

14. A vehicle comprising:
    a vehicle structure defining a vehicle opening;
    a closure pivotally connected to the vehicle structure for selectively covering the vehicle opening; and
    an air spring pivotally mounted to the vehicle structure and pivotally mounted to the closure and including a rod and a tube; the rod including a hollow housing centered about a longitudinal axis, having an inner rod diameter, and having a first end and an opposed second end, the housing including at least two, spaced tube slots extending axially from the second end toward the first end and defining at least two flexible arms, at least two rod cam extensions extending from the second end and including radially inwardly extending rod peaks defining a rod peak diameter that is less than the inner rod diameter; and the tube having an outer tube diameter centered about the longitudinal axis, a first end and an opposed second end slidably received in the housing, and a tube cam extension extending from the second end of the tube, the tube cam extension including a tube peak having a tube peak diameter that is less than the inner rod diameter and greater than the rod peak diameter.

15. The vehicle of claim 14 wherein the tube cam extension has an extension tube cam surface extending at a first angle relative to the longitudinal axis, and a retraction tube cam surface adjacent to and located farther from the first end of the tube than the extension tube cam surface and extending at a second angle relative to the longitudinal axis, the second angle being larger than the first angle, the tube peak being located between the extension tube cam surface and the retraction tube cam surface.

16. The vehicle of claim 15 wherein the at least two rod cam extensions each include an extension rod cam surface extending at a third angle relative to the longitudinal axis, a retraction rod cam surface adjacent to and located farther from the first end of the housing than the extension rod cam surface and extending at a fourth angle relative to the longitudinal axis, the fourth angle being larger than the third angle, the rod peak being located between the extension rod cam surface and the retraction rod cam surface on each of the at least two rod cam extensions.

17. The vehicle of claim 14 wherein the at least two rod cam extensions each include an extension rod cam surface extending at a first angle relative to the longitudinal axis, a retraction rod cam surface adjacent to and located farther from the first end of the housing than the extension rod cam surface and extending at a second angle relative to the longitudinal axis, the second angle being larger than the first angle, the rod peak being located between the extension rod cam surface and the retraction rod cam surface on each of the at least two rod cam extensions.

18. The vehicle of claim 14 wherein the rod includes an elastomeric boot extending around an outer surface of the housing and covering the at least two tube slots.

19. The vehicle of claim 14 including a second air spring, spaced from the air spring, and pivotally mounted to the vehicle structure and pivotally mounted to the closure.

20. The vehicle of claim 14 wherein the closure is a rear lift gate.

* * * * *